(12) United States Patent
Olsson

(10) Patent No.: US 10,255,662 B2
(45) Date of Patent: *Apr. 9, 2019

(54) IMAGE PROCESSING METHOD FOR DETAIL ENHANCEMENT AND NOISE REDUCTION

(71) Applicant: FLIR Systems AB, Täby (SE)

(72) Inventor: Stefan Olsson, Stockholm (SE)

(73) Assignee: FLIR Systems AB, Täby (SE)

( * ) Notice: Subject to any disclaimer, the term of this patent is extended or adjusted under 35 U.S.C. 154(b) by 12 days.

This patent is subject to a terminal disclaimer.

(21) Appl. No.: 15/457,783

(22) Filed: Mar. 13, 2017

(65) Prior Publication Data

US 2017/0186139 A1 Jun. 29, 2017

Related U.S. Application Data

(63) Continuation of application No. 14/464,478, filed on Aug. 20, 2014, now Pat. No. 9,595,087, which is a
(Continued)

(30) Foreign Application Priority Data

Feb. 21, 2012 (SE) .................................. 1230021-6

(51) Int. Cl.
*G06T 5/00* (2006.01)
*H04N 5/208* (2006.01)
(Continued)

(52) U.S. Cl.
CPC .............. *G06T 5/002* (2013.01); *G06T 5/003* (2013.01); *G06T 5/004* (2013.01); *G06T 5/005* (2013.01);
(Continued)

(58) Field of Classification Search
None
See application file for complete search history.

(56) References Cited

U.S. PATENT DOCUMENTS 5,038,388 A * 8/1991 Song ...................... G06T 5/004
382/266
5,961,461 A 10/1999 Mo et al.
(Continued)

FOREIGN PATENT DOCUMENTS

| WO | WO 02/28087   | 4/2002 |
| WO | WO 03/010716  | 2/2003 |
| WO | WO 2006/079955 | 8/2006 |

OTHER PUBLICATIONS

Kwok N, Shi H, Fang G, Ha Q. Adaptive scale adjustment design of unsharp masking filters for image contrast enhancement. InMachine Learning and Cybernetics (ICMLC), 2013 International Conference on Jul. 14, 2013 (vol. 2, pp. 884-889). IEEE. (Year: 2013).*
(Continued)

*Primary Examiner* — Michelle M Entezari
(74) *Attorney, Agent, or Firm* — Haynes and Boone, LLP

(57) ABSTRACT

One or more embodiments of the invention relate to an image processing system and method for detail enhancement and noise reduction, in which the method includes: (a) an original image is created, (b) an information measure is calculated on the basis of the original image, (c) a weighting measure is calculated on the basis of the information measure, (d) the original image is low-pass filtered with a low-pass filter to form a low-pass filtered image, (e) a high-pass filtered image is calculated by subtracting the low-pass filtered image from the original image, (f) a detail-enhanced and noise-reduced image is obtained by a high-pass image scaled with the weighting measure being added to the low-pass image. One or more embodiments of the invention additionally relate to an image processing
(Continued)

device comprising an image recording device, an image processing unit and an image display unit.

20 Claims, 1 Drawing Sheet

Related U.S. Application Data continuation of application No. PCT/SE2013/000020, filed on Feb. 11, 2013.

(51) Int. Cl.
*H04N 5/21* (2006.01)
*G06T 5/20* (2006.01)

(52) U.S. Cl.
CPC ............ *G06T 5/20* (2013.01); *H04N 5/208* (2013.01); *H04N 5/21* (2013.01); *G06T 2207/10048* (2013.01); *G06T 2207/20012* (2013.01); *G06T 2207/20024* (2013.01); *G06T 2207/20192* (2013.01)

(56) References Cited

U.S. PATENT DOCUMENTS

| | | | | |
|---|---|---|---|---|
| 6,313,883 | B1 | 11/2001 | Thaler | |
| 7,129,976 | B2* | 10/2006 | Jaspers | H04N 5/208 348/272 |
| 7,280,703 | B2* | 10/2007 | Gallagher | G06T 5/004 382/260 |
| 7,522,220 | B2* | 4/2009 | Lin | G06K 9/40 348/607 |
| 7,832,928 | B2* | 11/2010 | Topfer | G06T 5/50 250/370.09 |
| 8,031,967 | B2* | 10/2011 | Zhang | G06T 5/002 348/533 |
| 8,108,211 | B2* | 1/2012 | Baqai | G01V 1/28 704/200 |
| 8,542,944 | B2* | 9/2013 | Sun | G06K 9/40 382/128 |
| 9,286,658 | B2* | 3/2016 | Bhaskaran | G06T 5/002 |
| 2004/0047514 | A1 | 3/2004 | Gallagher et al. | |
| 2004/0258201 | A1 | 12/2004 | Hayashida | |
| 2006/0221249 | A1 | 10/2006 | Lin et al. | |
| 2007/0009170 | A1 | 1/2007 | Lin et al. | |
| 2007/0146236 | A1 | 6/2007 | Kerofsky et al. | |
| 2009/0220169 | A1 | 9/2009 | Bennett et al. | |
| 2009/0238486 | A1 | 9/2009 | Biezen et al. | |
| 2010/0074548 | A1 | 3/2010 | Pan et al. | |
| 2010/0278423 | A1 | 11/2010 | Itoh et al. | |
| 2010/0303376 | A1 | 12/2010 | Chen et al. | |
| 2012/0106815 | A1 | 5/2012 | Yang et al. | |
| 2013/0034307 | A1 | 2/2013 | Jerdev | |
| 2013/0177242 | A1 | 7/2013 | Adams et al. | |

OTHER PUBLICATIONS

Crowley, James L., and Richard M. Stern. "Fast computation of the difference of low-pass transform." IEEE transactions on pattern analysis and machine intelligence 2 (1984): 212-222. (Year: 1984).*

Trussell, H.J., "Processing of X-ray images", Proceedings of the IEEE, May 1981, pp. 615-627, vol. 69, Issue 5, IEEE, Piscataway, New Jersey.

Tom, Victor T., "Adaptive filter techniques for digital image enhancement", International Society for Optical Engineering, Jul. 22, 1985, pp. 29-42, vol. 0528, No. 22, SPIE Proceedings.

Deng, Guang, "A Generalized Unsharp Masking Algorithm", May 1, 2011, pp. 1249-1261, vol. 20, No. 5, IEEE Transactions on Image Processing, IEEE Service Center, Piscataway, New Jersey.

Pratt, W.K., "Digital Image Processing-Image Enhancement", Jan. 1, 1991, pp. 263-285, second edition, section 10.1.1.

* cited by examiner

IMAGE PROCESSING METHOD FOR DETAIL ENHANCEMENT AND NOISE REDUCTION

CROSS-REFERENCE TO RELATED APPLICATIONS

This application is a continuation of U.S. patent application Ser. No. 14/464,478 filed Aug. 20, 2014 and entitled "IMAGE PROCESSING METHOD FOR DETAIL ENHANCEMENT AND NOISE REDUCTION" which is hereby incorporated by reference in its entirety.

U.S. patent application Ser. No. 14/464,478 is a continuation of International Patent Application No. PCT/SE2013/000020 filed Feb. 11, 2013 and entitled "IMAGE PROCESSING METHOD FOR DETAIL ENHANCEMENT AND NOISE REDUCTION" which is hereby incorporated by reference in its entirety.

International Patent Application No. PCT/SE2013/000020 claims the benefit of Swedish Patent Application No. SE 1230021-6 filed Feb. 21, 2012, which is hereby incorporated by reference in its entirety.

TECHNICAL FIELD

One or more embodiments of the present invention relate to an image processing method comprising detail enhancement and noise reduction of image information. In addition, one or more embodiments of the invention relate to an image processing device comprising an image recording device, an image processing unit and an image display unit.

BACKGROUND

Various solutions for image processing, such as, for example, various forms of filtering or enhancement of details, are well-known techniques for improving the visualization of a recorded image. Various types of compression of image information are also known, partly in order to reduce the information content of the image and thus obtain images with smaller information quantity, but also in order to adapt the image for the viewer of the image. A human has a limited capacity as a viewer to differentiate between both details and different colours and grey scales.

Systems for recording and displaying images taken in conditions where no daylight is present have used various forms of image processing to improve the information content of the recorded image. It is common practice that the contours of the objects which are present in the recorded image are enhanced. Image processing is preferably realized by mathematical methods on a digital representation of the information content of the recorded image. The Sobel operator is an example of a well-known mathematical method for enhancing the contours, a so-called edge-enhancing or edge-preserving method, on a recorded image. A common problem in the enhancement of image details is that the noise in the image is also intensified.

One example of image recording when the light conditions are such that it is difficult to use normal optical equipment is the use of IR video or IR photography, in which IR stands for infrared. Details and structure in IR video are normally constituted by small variations in signal strength within a local region. At the same time, the total dynamic range in a single image can be large. The difference in signal level between a cold region and a warm region can result in about 65,000 grey levels being able to be recorded. Typically this signal will be compressed so that its total dynamic range becomes 8 bits or 256 distinct grey levels from black to white in order to fit the video format and be better suited for presentation to an operator. The reason for this is an adaptation to video standards. A purely linear compression of the signal is almost always unsuitable, since a small region with widely differing signal level is at risk of using all the dynamic range, whereupon an image having, in principle, just a few colour and grey scale levels is obtained.

A common way of getting round this is to utilize the histogram of the image (distribution of signal levels) and, on the basis of this, determine suitable conversion, from 16 to 8 bits, for example, so that the available dynamic is not spent or used at levels at which there is no signal. Even though histogram equalization is very effective in many contexts, it is generally difficult to foresee whether the correct details will actually be accentuated. For this, other methods which give more robust results are used. One such method is to use an edge-preserving low-pass filter to produce a background image without details or structure and subtract this image from the original image in order thereby to produce the small signal variations in which the small signal variations are constituted by the details.

Edge-preserving low-pass filters are previously known and an example of such a filter is described in C. Tomasi and R. Manduchi, Bilateral Filtering for Gray and Color Images, Proc. 1998 IEEE 6th. Int. Conf. on Computer Vision, Bombay, India. By replacing the value of each image point with the mean value of the values of neighbouring image points, a smooth image is obtained. If non-edge-preserving filters are used, image points having neighbours with widely differing signal intensity will be affected, so that they end up at a higher or lower level than they actually should.

A problem with the currently known methods for detail enhancement and noise reduction of image information is that, in the case of high edge enhancement, then a high noise level is also obtained.

SUMMARY

One or more embodiments of the present invention are directed to a method for detail enhancement and noise reduction of image information, so that a low noise level is obtained even if there is a high level of edge enhancement. Other embodiments of the invention are described in greater detail in connection with the detailed description of the invention.

One or more embodiments of the present invention relate to an image processing method for detail enhancement and noise reduction, the method including:
(a) an original image is created;
(b) an information measure is calculated on the basis of the original image;
(c) a weighting measure is calculated on the basis of the information measure;
(d) the original image is low-pass filtered with a low-pass filter to form a low-pass filtered image;
(e) a high-pass filtered image is calculated by subtracting the low-pass filtered image from the original image;
(f) a detail-enhanced and noise-reduced image is obtained by a high-pass image scaled with the weighting measure being added to the low-pass image.

According to further embodiments of the improved image processing method for detail enhancement and noise reduction according to one or more embodiments of the invention:
the weighting measure is calculated on the basis of a look-up table with the results for the calculated information measure as input data;

the weighting measure is calculated on the basis of scaling with a constant with the calculated information measure as input data;

the information measure is a spread measure;
the spread measure is a standard deviation;
the information measure is an edge detection measure;
the information measure is an entropy measure.

One or more embodiments of the invention are further constituted by an image processing device comprising an image recording device, an image processing unit, and an image display unit, in which:

(a) an original image is created with the recording device;
(b) an information measure is calculated in an image processing unit on the basis of the original image;
(c) a weighting measure is calculated in an image processing unit on the basis of the information measure;
(d) the original image is low-pass filtered in the image processing unit with a low-pass filter to form a low-pass filtered image;
(e) a high-pass filtered image is calculated in the image processing unit by subtracting the low-pass filtered image from the original image;
(f) a detail-enhanced and noise-reduced image is obtained by a high-pass image scaled with the weighting measure being added to the low-pass image in the image processing unit;
(g) the detail-enhanced and noise-reduced image is visualized in the image display unit.

According to further embodiments of the improved image processing device according to the invention:

the image recording device is an IR camera;
the detail-enhanced and noise-reduced image is compressed prior to visualization in the image display unit;
the weighting measure is calculated in the image processing unit on the basis of a look-up table with the results for the calculated information measure as input data;
the weighting measure is calculated in the image processing unit on the basis of scaling with a constant with the calculated information measure as input data;
the information measure is a spread measure;
the spread measure is a standard deviation;
the information measure is an edge detection measure;
the information measure is an entropy measure.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the figures of the appended sheets of drawings that will first be described briefly.

BRIEF DESCRIPTION OF THE DRAWINGS

Various embodiments of the present invention will be described in greater detail below with reference to the appended figures, in which.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
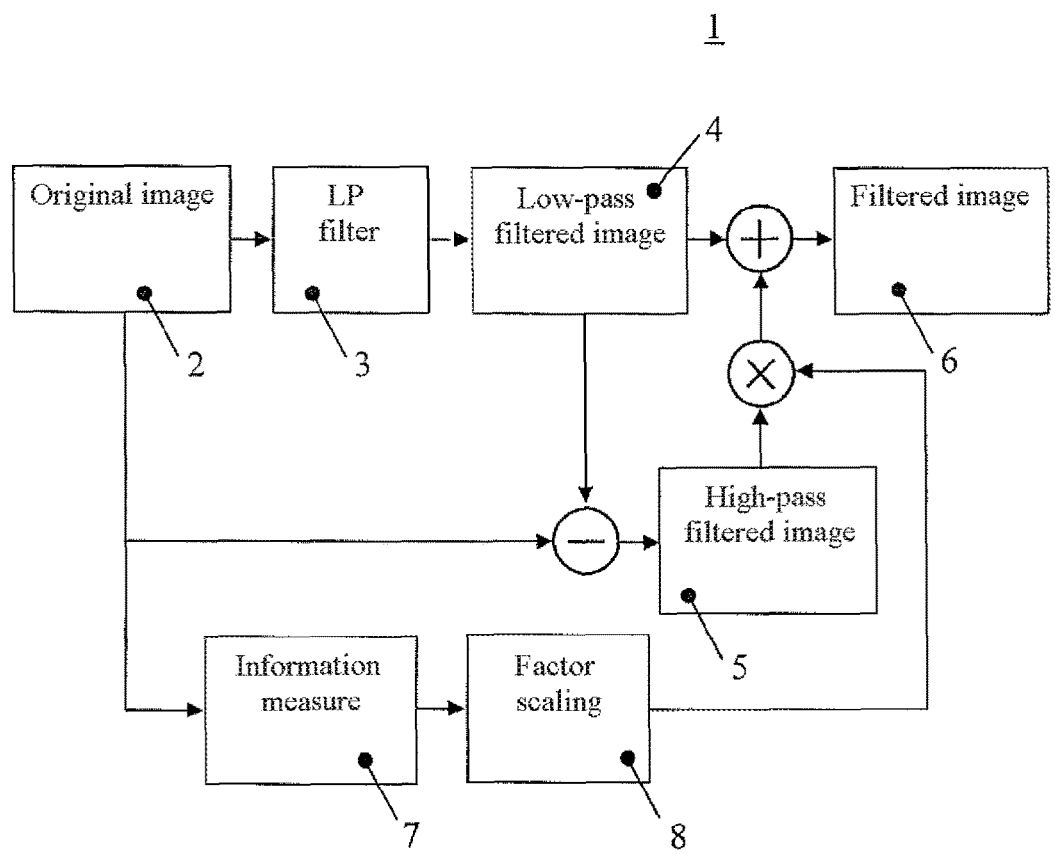
FIG. 1 shows a block diagram for an image processing method for detail enhancement and noise reduction according to one or more embodiments of the invention.

A block diagram for an image processing method for detail enhancement and noise reduction according to one or more embodiments the invention is shown in FIG. 1. The image processing method is based on a grouping of image information to form parts of the complete image, also referred to as the original image 2. The grouping of image information is preferably realized in the form of a 16-bit frame, in which the frame defines a set of digital information in the form of a number of digital bits. A complete digital image is divided into a large number of smaller groups or frames for easier image processing.

The original image 2 is low-pass filtered in the LP filter block 3, which is an edge-preserving low-pass filter. Edge-preserving low-pass filters are well-known and described in the literature and are not discussed in more detail in the application text. The low-pass filtered image 4 is subtracted from the original image 2 to create a high-pass filtered image 5. The low-pass filtered image 4 can also be compressed with a suitable logarithm, for example histogram equalization, mainly in order to reduce the information content in the low-pass filtered image and thus also the original image. The original image 2 is used to calculate an information measure 7, which constitutes a measure of the information content in the original image 2, for example a standard deviation. Calculated measures other than standard deviation can also be used, such as various forms of spread measures or other measures for the identification of information content in the original image 2. Examples of other information measures 7 are measures which identify prominent, distinguishing or discernible details from the original image 2, also referred to as saliency. In addition, the information measure can be a measure of edges in the image, referred to as edge detection measure, or a measure of the entropy in the image, referred to as entropy measure, or other measures relating to order or the fact that an image or other information quantity has a certain state. The calculated information measure 7 is weighted or scaled in the factor scaling block 8 on the basis of the method chosen by the particular application. By adding the low-pass filtered image 4 to the high-pass filtered image 5 with weighting of the calculated information measure 7, or of a value proportional to the calculated information measure 7, a filtered image 6 can be created. The filtered image 6 is a detail-enhanced and noise-reduced image of the original image 2. The weighting is realized by the high-pass filtered image 5 being multiplied by a factor from the factor scaling block 8. The factor-scaled result is added to the low-pass filtered image 4 to create a filtered image 6. The filtered image 6 preferably contains less information than the original image 2 and is adapted for the particular application and/or equipment, for example by a reduction in the number of grey tones.

Figure 2:
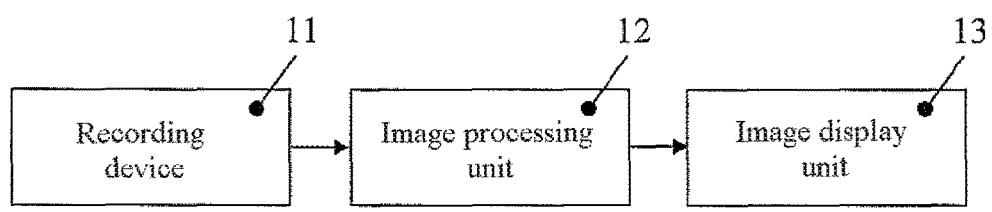
FIG. 2 shows a block diagram for components in an image processing system according to one or more embodiments of the invention.

In FIG. 2 is shown a block diagram for one or more embodiments in an image processing system 10 according to the embodiments of the invention. The image processing system 10 consists of a recording device 11, which is an image collection unit and can be a camera or image sensor, an image processing unit 12, as well as an image display unit 13. The recording device 11 records an image of the target or region at which the image collection unit has been directed. The recording device 11 is preferably in this case an IR camera, but can also be other types of imagecollecting equipment, such as cameras or sensors. The image processing unit 12 processes the image from the recording device 11 with algorithms suitable for the purpose. Examples of suitable algorithms are edge enhancement, compression, noise reduction and other types of filtering algorithms or image modification algorithms. The image processing is preferably carried out in microprocessors, and/or signal processors, comprising programmable electronics. The image processing unit 12 is thus constituted by a device for handling image information from the recording device 11, a device for image-processing the image information from the image collection unit, and a device for transferring the image-processed image information to an image display unit 13. The image display unit 13 can be constituted by a display or other optical visualization equipment adapted on the basis of the use and installation of the image processing system 10.

It will be appreciated that the above-described image processing method and/or the device for image recording, image processing and presentation of an image-processed image can in principle be applied to all image processing systems, such as IR cameras, cameras or other optical sensors.

While the invention has been described in detail in connection with only a limited number of embodiments of the invention, it should be readily understood that the invention is not limited to such disclosed embodiments. Rather, the invention may be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims and functional equivalents thereof.

What is claimed is:

1. An image processing method for detail enhancement and noise reduction, the method comprising:
    calculating an information measure derived from original image information, in which the information measure is a spread measure or an entropy measure;
    calculating a weighting measure based, at least in part, on the information measure derived from the original image information, wherein the weighting measure is greater than zero and is calculated on the basis of scaling with a constant with the calculated information measure as input data;
    applying a low-pass filter to an original image to form a low-pass filtered image;
    calculating an uncompressed high-pass filtered image by subtracting the low-pass filtered image from the original image;
    scaling the uncompressed high-pass filtered image with the weighting measure;
    compressing the low-pass filtered image; and
    obtaining a detail-enhanced and noise-reduced image by adding the uncompressed high-pass filtered image scaled with the weighting measure to the compressed low-pass filtered image.

2. The image processing method according to claim 1, wherein the weighting measure is calculated on the basis of a look-up table with the results for the calculated information measure as input data.

3. The image processing method according to claim 1, wherein the information measure is the spread measure, and wherein the spread measure is a standard deviation.

4. The image processing method according to claim 1, wherein the original image information comprises the original image.

5. The image processing method according to claim 1, wherein the original image information comprises more than one image.

6. An image processing device configured to perform the image processing method according to claim 1, wherein the image processing device comprises a camera and/or an infrared camera.

7. The image processing method according to claim 1, further comprising:
    compressing the detail-enhanced and noise-reduced image; and
    displaying the compressed detail-enhanced and noise-reduced image.

8. The image processing method according to claim 1, wherein the information measure is the entropy measure.

9. An image processing device comprising:
    an image recording device configured to create an original image; and
    an image processing unit configured to:
        calculate an information measure based on original image information, wherein the information measure is a spread measure or an entropy measure,
        calculate a weighting measure based, at least in part, on the information measure, wherein the weighting measure is greater than zero and is calculated on the basis of scaling with a constant with the calculated information measure as input data,
        apply a low-pass filter to the original image to form a low-pass filtered image,
        calculate an uncompressed high-pass filtered image by subtracting the low-pass filtered image from the original image,
        scale the uncompressed high-pass filtered image with the weighting measure,
        compress the low-pass filtered image, and
        obtain a detail-enhanced and noise-reduced image by adding the uncompressed high-pass filtered image scaled with the weighting measure to the compressed low-pass filtered image.

10. The image processing device according to claim 9, wherein the image recording device is an infrared (IR) camera.

11. The image processing device according to claim 9, further comprising an image display unit configured to visualize the detail-enhanced and noise-reduced image, wherein the detail-enhanced and noise-reduced image is compressed prior to visualization in the image display unit.

12. The image processing device according to claim 9, wherein the weighting measure is calculated in the image processing unit on the basis of a look-up table with the results for the calculated information measure as input data.

13. The image processing device according to claim 9, wherein the information measure is the spread measure, and wherein the spread measure is a standard deviation.

14. The image processing device according to claim 9, wherein the original image information comprises the original image.

15. The image processing device according to claim 9, wherein the image recording device comprises an optical sensor.

16. The image processing device according to claim 9, wherein the image processing unit is further configured to compress the detail-enhanced and noise-reduced image using histogram equalization prior to visualization in an image display unit.

17. The image processing device according to claim 9, wherein the image recording device comprises an image sensor.

18. The image process device according to claim 9, wherein the low-pass filter is an edge-preserving low-pass filter.

19. The image processing method according to claim 1, further comprising capturing the original image using an image sensor.

20. The image processing method according to claim 1, wherein the low-pass filter is an edge-preserving low-pass filter.

* * * * *